United States Patent [19]

Hoogendoorn

[11] 4,379,748
[45] Apr. 12, 1983

[54] METHOD OF SEPARATING PAPER AND PLASTIC PIECES

[75] Inventor: Arie Hoogendoorn, Nieuw-Vennep, Netherlands

[73] Assignee: Esmil International B.V., Amsterdam, Netherlands

[21] Appl. No.: 232,849

[22] Filed: Feb. 9, 1981

[30] Foreign Application Priority Data

Feb. 8, 1980 [NL] Netherlands .................... 8000791

[51] Int. Cl.³ .................... B07B 9/02; B07B 11/06
[52] U.S. Cl. ................................ 209/11; 209/138; 34/12; 162/55; 423/DIG. 18
[58] Field of Search ............... 209/3, 4, 11, 138; 241/DIG. 38; 34/12; 162/55; 423/DIG. 18

[56] References Cited

U.S. PATENT DOCUMENTS

| | | | |
|---|---|---|---|
| 2,494,153 | 11/1950 | Andrews | 209/11 X |
| 3,441,131 | 4/1969 | Gebauer | 209/3 |
| 3,524,594 | 8/1970 | Anderson | 241/DIG. 38 |
| 3,655,043 | 9/1972 | Wochnowski | 209/138 |
| 3,814,420 | 12/1975 | Laundre | 241/23 X |
| 3,929,628 | 12/1975 | Denevi | 209/138 X |
| 4,003,136 | 1/1977 | Vincent | 34/12 |
| 4,034,862 | 7/1977 | Bahri | 209/11 |
| 4,160,722 | 1/1979 | Marsh | 209/138 X |

FOREIGN PATENT DOCUMENTS

| | | | |
|---|---|---|---|
| 2122 | 5/1979 | European Pat. Off. | 209/3 |
| 2441811 | 3/1976 | Fed. Rep. of Germany | 209/11 |
| 2804548 | 8/1979 | Fed. Rep. of Germany | 209/11 |

*Primary Examiner*—David L. Lacey
*Attorney, Agent, or Firm*—Jon M. Lewis

[57] ABSTRACT

In an upward gas stream sifter for separating sheet-like pieces of paper and plastic in a wetted mixture, the gas is heated to at least 60° C. in order to dry surface moisture on the plastic. The temperature of the gas is not so high that the plastic shrivels. This increases the difference in density between the pieces of plastic and wet paper, thus assisting the separation.

Optionally some gas may enter the mixture feed duct through a gas permeable part of its wall, to prevent accumulation of mixture on the wall.

If the mixture is derived from household rubbish and the plastic is mostly polyethylene the gas may enter the sifter at 120° C. and leave it at about 70° C.

12 Claims, 1 Drawing Figure

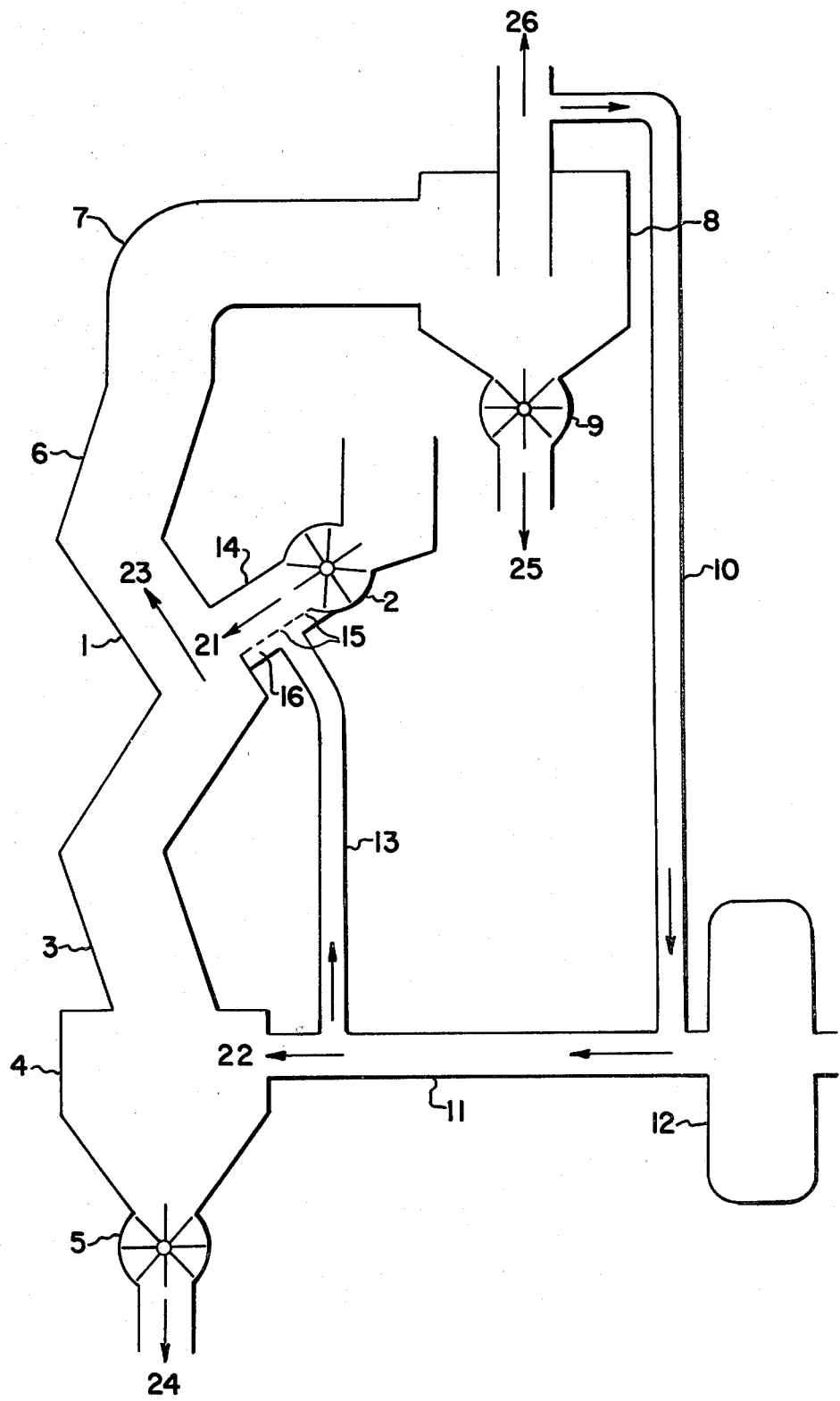

METHOD OF SEPARATING PAPER AND PLASTIC PIECES

BACKGROUND OF THE INVENTION

1. Field of the Invention

The present invention relates to a method, for separating paper and plastics in a wetted mixture of essentially paper and plastics sheeting pieces, using an upward stream of gas. The invention also relates to separating means for carrying out this method.

2. Description of the Prior Art

Usually a sifter used for separating paper and plastics pieces is a vertically arranged zig-zag duct in which the mixture is separated by an upward stream of gas. This separation is due to the factors which determine whether the pieces of the mixture fall or rise in the stream of gas. In the case of a mixture of pieces of paper and plastics sheeting it is particularly the difference in the density of the materials which is important in the separation process.

A process of this type is disclosed from Dutch Pat. No. 158.565. This patent describes how, before sifting, the mixture is wetted, so that the paper absorbs a quantity of moisture, thus magnifying the small difference between the density of paper and plastics when dry, to produce better separation.

However, in use of this process, it has been found that the difference in the density of the paper and the plastics after wetting is less than expected and that optimum separation of these materials is not obtained. It is believed that this is because the moisture increases the weight not only of the paper but also of the plastics, because a film of the liquid used to moisten the mixture forms on the pieces of plastics.

Two further items of prior art are discussed below.

SUMMARY OF THE INVENTION

The object of the invention is to improve this known process of separating paper and plastics sheeting pieces, using wetting of the mixture.

In the present invention the gas supplied to separate the mixture is at an elevated temperature of at least 60° C., the temperature being such that the plastics material of the mixture retains its shape and does not contract.

The invention is based on the discovery that the hot gas used dries the paper and the plastics to different degrees, so that, during drying, the film of liquid on the pieces of plastics is removed more quickly than the liquid which is absorbed into the paper. This differential drying effect magnifies the initially small difference in the density of the materials, thus improving separation.

It has been found that a temperature of at least 60° C. is necessary for satisfactory separation.

The temperature of the gas is limited by the fact that plastics sheet tends to contract to a crumpled mass or lump when heated. Whether or not this happens depends on factors such as the type of plastics, the degree of drying and the time which the material is in contact with the hot gas. This contraction is undesirable in the sifting process. Thus, according to the present invention, hot gas is supplied at such a temperature that the plastic material retains its shape in the sifter and does not contract. The temperature at which the commonest plastic foil in household refuse, polyethylene, contracts is approximately 120° C.

It is to be noted that Dutch Published Patent Applications Nos. 75.13994 and 76.04096 are also concerned with the separation of a mixture of paper and plastics pieces with the aid of gas at an elevated temperature. However in these cases the temperature of the gas is raised so high that the plastics in the mixture does contract to form lumps, with the paper and the plastic not being separated until after this change in form has occurred. In this case, therefore, it is the difference in the form of the paper and the plastic rather than the difference in their densities which forms the basis of the separation which, furthermore, does not itself take place in a gas stream.

The hot gas used in the present invention is not restricted to hot air but may be or include other hot gases, such as, for example, a combustion gas with residual heat resulting from a combustion process.

It is desirable, in order to achieve good separation, that the paper retains its sheetlike form and that it does not break down into pulp before separation as a result of excessive wetting. To prevent this, the moisture content of the paper should remain such that the cohesion between the paper fibres is retained. On the other hand, however, the paper should preferably still be slightly damp after separation in order to prevent the paper fibres from contracting and breaking down to form dust as the dry paper crumbles. Satisfactory results are obtained if the mixture is wetted to such an extent that the moisture content of the paper in the mixture to be separated amounts to at least 35% by weight based on the total weight of the paper and moisture.

In a practical example of the process, the hot gas enters the sifter at a temperature of 120° C. and leaves at a temperature of 70° C. In order to save energy it may be advantageous to recirculate this gas, returning it to a gas supply line on the sifter. However, because of the moisture content of the waste gas, this is only partially possible. Thus, only part of the gas emerging from the separation is returned to the sifter inlet.

It has been found that the mixture has a tendency to accumulate on the internal wall of the duct feeding the mixture to the gas stream. For this reason, part of the gas to be supplied to gas stream is admitted through the wall of the feed duct, at least part of which will allow gas to pass through it. In this way, accumulation of the mixture on the wall of the feed duct can be reduced or avoided.

In order to prevent the above-mentioned accumulation of the mixture in the feed duct, the sifter should preferably be constructed in such a way that at least part of the wall of the mixture feed duct is provided with channels in the form of perforations or slots and that these channels communicate with a chamber on the outside of the feed duct and that this chamber is connected by means of a pipe to the gas supply line or to some other source of gas.

Because of the heat of evaporation required for drying the mixture, the temperature of the hot gas falls as the gas rises and consequently its volume decreases. Thus, with a sifter of constant cross section throughout, the velocity of the upward stream of gas decreases as it rises higher in the sifter. However, in order to achieve good separation it is desirable to maintain the velocity of the gas constant over the height of the separation process. Therefore, the sifter should preferably be designed in such a way that its cross section decreases upwardly, this decrease being generally equivalent to the reduction in the volume of the gas caused by the cooling of the hot gas as it passes up the sifter.

BRIEF INTRODUCTION OF THE DRAWING

An example of the method and means of the present invention will now be described with reference to the accompanying drawing, which shows diagrammatically a sifter operated and constructed according to the invention.

DESCRIPTION OF THE PREFERRED EMBODIMENT

FIG. 1 shows in diagrammatic form a sifter for performing a process embodying the present invention. A vertical zig-zag duct 1 is provided at a certain height with a charging device 2, through which the mixture to be separated is introduced into the sifter in the direction of arrow 21. The bottom 3 of the sifter is connected to a chamber 4 which is supplied with hot gas in the direction of arrow 22. The pieces of paper in the mixture drop down to the bottom against the upward stream of hot gas represented by arrow 23 and leave the sifter via discharging device 5 in the direction of arrow 24. The wet pieces of plastic material in the mixture are dried by the hot gas to a greater degree than the paper and are carried away upwards by the gas. The top 6 of the sifter is connected tangentially to a cyclone separator 8 via duct 7. In this cyclone separator the pieces of plastic and the hot gas are separated. The plastic is removed via a discharging device 9 in the direction of arrow 25. The hot gas is removed in the direction of arrow 26. Part of this hot gas is returned via pipe 10 to the gas supply line 11 which is supplied with hot gas from a hot gas source 12.

A small proportion of the gas to be supplied to the sifter is introduced into the mixture feed duct 14 via a pipe 13. At least part of the wall of this feed duct is provided with channels 15 which communicate with a chamber 16 to which the pipe 13 is connected.

What is claimed is:

1. In a method of separating paper and plastics, in a wetted mixture consisting substantially of paper and plastic sheeting pieces, by use of an upwardly moving stream of gas moving along a flow path into which said path said wetted mixture is passed, said path having an upward end and a downward end, the improvement comprising:
admitting a gas, for producing said upwardly moving stream of gas, into said path at an elevated temperature which is at least 60° C. but is not so high that the plastic sheeting deforms through the action of heat, and
employing said gas to effect at least partial drying of said plastic sheeting pieces such that separation will be improved, by a downward movement of said paper in said upwardly moving stream of gas and by upward movement of said plastic sheeting pieces in said upwardly moving stream of gas due to the enhanced differences in densities of said paper and said plastic sheeting.

2. A method according to claim 1 wherein the pieces of paper in the said wetted mixture, before entering said upwardly moving stream of gas, have a moisture content of at least 35% by weight moisture of the total weight of paper and moisture.

3. A method according to claim 1 or claim 2 wherein introducing said gas, for producing said upwardly moving stream of gas, at said lower end of said path at a level below the level of introduction of said wetted mixture of paper and plastic, establishing generally upward flow of said gas, for producing said upwardly moving stream of gas, from said downward end to said upward end, and recirculating a portion of said upwardly moving stream of gas from said upward end to said downward end.

4. A method according to claim 3 wherein the said wetted mixture is passed into the path through a feed duct intermediate said upward end and said downward end, and said gas, for producing said upwardly moving stream of gas, is supplied to said feed duct through a gas-permeable portion of the wall thereof.

5. A method according to claim 3 wherein the speed of movement of the gas, forming said upwardly moving stream of gas, remains substantially constant along the path, the cross section of the upwardly moving stream of gas decreasing along said path with increasing distance from the downward end of said path so as to compensate for reduction in the volume of the gas moving upwardly.

6. A method according to claim 2 wherein the said wetted mixture is passed into the path through a feed duct intermediate said upward end and said downward end, and said gas, for producing said upwardly moving stream of gas, is supplied to said feed duct through a gas-permeable portion of the wall thereof.

7. A method according to claim 2 wherein the speed of movement of the gas, forming said upwardly moving stream of gas, remains substantially constant along the path, the cross section of the upwardly moving steam of gas decreasing along said path with increasing distance from the downward end of said path so as to compensate for reduction in the volume of the gas moving upwardly.

8. A method according to claim 1 wherein the said wetted mixture is passed into the path through a feed duct intermediate said upward end and said downward end, and said gas, for producing said upwardly moving stream of gas, is supplied to said feed duct through a gas-permeable portion of the wall thereof.

9. A method according to claim 8 wherein the speed of movement of the gas, forming said upwardly moving stream of gas, remains substantially constant along the path, the cross section of the upwardly moving steam of gas decreasing along said path with increasing distance from the downward end of said path so as to compensate for reduction in the volume of the gas moving upwardly.

10. A method according to claim 1 wherein the speed of movement of the gas, forming said upwardly moving stream of gas, remains substantially constant along the path, the cross section of the upwardly moving steam of gas decreasing along said path with increasing distance from the downward end of said path so as to compensate for reduction in the volume of the gas moving upwardly.

11. The method according to claim 1 including drying said plastic sheeting pieces to a greater extent than said paper.

12. A method of separating pieces of plastics material from pieces of paper in a wetted mixture consisting substantially entirely of sheet shaped pieces of paper and plastics material in which:

(a) a stream of gas moves upwardly along a path from a downward end to an upward end, the temperature of the gas at the downward end being at least 60° C. but not so high that the said sheet shaped pieces of plastics material deform through the action of heat;
(b) the said mixture is passed into the path of the said upwardly moving stream;
(c) said paper sheet shaped pieces from said mixture fall downwardly through the said upwardly moving stream and are removed from the stream at the downward end thereof;
(d) said plastic sheet shaped pieces from said mixture are carried upwardly by the said upwardly moving stream of gas past the upward end of the path and are subsequently separated from the gas stream.

* * * * *